United States Patent Office 3,769,209
Patented Oct. 30, 1973

3,769,209
SOLUBLE OIL ADDITIVE CONCENTRATE
Le Roy W. Holm, Fullerton, Calif., assignor to Union Oil Company of California, Los Angeles, Calif.
No Drawing. Filed Apr. 12, 1971, Ser. No. 133,356
The portion of the term of the patent subsequent to Sept. 12, 1989, has been disclaimed
Int. Cl. B01j 13/00; E21b 43/20
U.S. Cl. 252—8.55 D
8 Claims

ABSTRACT OF THE DISCLOSURE

An additive concentrate for the formulation of soluble oils comprising an admixture of surface active alkyl aryl sulfonates and secondary butyl alcohol in the proportion of about 1 to 12 parts by volume of alkyl aryl sulfonates per part of secondary butyl alcohol. The surface active sulfonate can be a mixture of preferentially oil-soluble and preferentially water-soluble alkyl aryl sulfonates.

---

This invention relates to soluble oil compositions, and more particularly concerns an additive concentrate useful in formulating both anhydrous and water-containing soluble oils.

Soluble oils are oleaginous compositions containing surface active agents and one or more stabilizing agents which have the ability to spontaneously emulsify with water to form water-in-oil microemulsions. Both anhydrous and water-containing soluble oils are particularly useful as miscible displacement agents for recovering oil from subterranean reservoirs by miscible flooding, in the treatment of water injection wells to ameliorate oil blockage from the formation surrounding the well, and in the treatment of producing oil wells to stimulate increased oil production.

Many of the soluble oils used in oil recovery and well treating operations are formulated with crude oils which are most conveniently available at the point of use. Also, since the bulk of the composition consists of crude oil and water, it is advantageous to prepare the soluble oils at the point of use to minimize storage and shipping costs. Thus, there is need for an additive concentrate that may be simply and conveniently admixed with crude oil, or other liquid hydrocarbon, and water at the point of use to form the desired anhydrous and water-containing soluble oils.

Accordingly, the principal object of this invention is to provide an additive concentrate from which anhydrous and water-containing soluble oils can be prepared by the addition of appropriate proportions of liquid hydrocarbon and water.

Another object of this invention is to provide an additive concentrate useful in formulating crude oil base anhydrous and water-containing soluble oils.

A still further object of this invention is to provide an additive concentrate useful in formulating crude oil base soluble oils exhibiting superior properties.

An even further object of this invention is to provide an additive concentrate that can be shipped to a point of use and admixed with liquid hydrocarbon and water to yield soluble oils having superior properties.

Other objects and advantages of this invention will be apparent from the following description.

Briefly, this invention contemplates an additive concentrate from which anhydrous and water-containing soluble oils can be formed by adding liquid hydrocarbon and water. The additive concentrate is an admixture of surface active alkyl aryl sulfonate and secondary butyl alcohol in the proportion of about 1 to 12 parts by volume of sulfonate per part of secondary butyl alcohol.

The surface active materials employed in the additive concentrate of this invention are those that when admixed with a suitable liquid hydrocarbon and a stabilizing agent form a soluble oil that upon the subsequent addition of water yield microemulsions of the water-in-oil type. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar, groups in a surfactant material expressed by a numerical value designated HLB number. The spreading coefficient is an indication of the facility with which one liquid spreads upon another liquid. Spreading coefficients greater than 0 indicate that the first liquid will spread upon the second, and coefficients less than 0 indicate that the supernatant liquid will simply form floating lenslike drops. Surface active materials, or mixtures of materials, possessing the ability to spontaneously emulsify water in oil exhibit average HLB numbers of about 3 to 7, and the most negative spreading coefficient consistent with the system.

Various preferentially oil-soluble alkyl aryl sulfonates and mixtures of preferentially oil-soluble and preferentially water-soluble alkyl aryl sulfonates exhibit the ability to spontaneously emulsify oil and water to produce water-in-oil micro-emulsions. The preferentially oil-soluble surfactant material is an oil-soluble, relatively water-insoluble organic sulfonate that exhibits substantially greater solubility in oil than in water. Some preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

The sulfonates useful in the additive concentrate of this invention are preferably in the form of their sodium salts, however, other salts such as the potassium and ammonium salts can be used.

One class of preferentially oil-soluble organic sulfonate useful in these concentrates are oil-soluble alkyl aryl sulfonates that contain only one sulfonic group attached to an alkyl aryl hydrocarbon. The preferentially oil-soluble alkyl aryl sulfonates are those which in the form of their sodium salts have average molecular weights of more than about 400. Among the preferred preferentially oil-soluble organic sulfonates are alkyl sodium benzene sulfonates and alkyl sodium polyaryl sulfonates having average molecular weights of more than about 400. It has been found that in soluble oils compounded from petroleum crude oil or other high boiling hydrocarbons, superior results are obtained by employing as the preferentially oil-soluble organic sulfonate alkyl aryl sulfonates which in the form of their sodium salts have an average molecular weight above about 450, and preferably in the range of about 480 to 550.

The preferentially water-soluble organic sulfonates include water-soluble alkyl aryl sulfonates which in the form of their sodium salts have molecular weights of less than about 400 or which contain more than one sulfonic group per molecule.

The preferentially oil-soluble alkyl aryl sulfonates and preferentially water-soluble alkyl aryl sulfonates useful in the concentrates of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield a mixture of alkyl aryl sulfonates which in the form of their sodium salts have an average molecular weight of more than about 400. The preferred preferentially water-soluble alkyl aryl sulfonates are prepared by selecting the alkyl aryl hydrocarbon mixture so that when sulfonated, the resulting mixture of alkyl aryl sulfonates in the form of their sodium salts have an average molecule weight of less than about 400, or by sulfonating sufficiently to form the polysulfonates.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "natural petroleum sulfonates" is a commercial designation of petroleum sulfonates which are obtained by treatment of petroleum fractions, particularly solvent treated aromatic fractions, with sulfuric acid, fuming sulfuric acid, or sulfur trioxide. Upon sulfonation, two types of general products are formed which are designated mahogany acid sulfonates and green acid sulfonates. This terminology is based on the colors imparted to the sulfonates in solution; a brownish color being imparted to the sulfonates which remain in the oil and the greenish color being imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights, with the mahogany or oil-soluble sulfonates generally containing the sulfonates of higher molecular weights. The green sulfonates, or water soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. That is, the additive concentrates of this invention contain between about 1 to 12 parts of preferentially oil-soluble sulfonate per part of preferentially water-soluble sulfonate. Although the optimum surfactant combination is dependent upon the properties of the resulting soluble oils and microemulsions and the application for which they are used, in many applications it is found that superior results are obtained with a surfactant combination containing about 1 to 4 parts of preferentially water-soluble surface active material; and more particularly, with a surfactant mixture containing about 2 to 3 parts of preferentialy oil-soluble agent per part of preferentially water-soluble agent.

Secondary butyl alcohol, also designated butanol-2 is a colorless liquid solvent that is completely miscible with oil and partially miscible with water, i.e., secondary butyl alcohol is miscible with water in limited proportion. When included in a minor proportion in a soluble oil, secondary butyl alcohol functions as a stabilizing agent rendering the surface active component of the soluble oil more effective and enhancing the properties of the microemulsions formed by the addition of water to a soluble oil.

Accordingly, the additive concentrates of this invention are admixtures of preferentially oil-soluble alkyl aryl sulfonates, or mixtures of preferentially oil-soluble alkyl aryl sulfonates and preferentially water-soluble alkyl aryl sulfonates, and secondary butyl alcohol in the proportion of about 1 to 12 parts by volume alkyl aryl sulfonate per part of secondary butyl alcohol. A preferred additive concentrate composition is from about 2 to 7 parts by volume alkyl aryl sulfonate per part of secondary butyl alcohol.

Typically, surface active alkyl aryl sulfonates are available as liquid solutions containing about 20 to 80 weight percent sulfonates, with the balance of the solution being comprised of oil, water, inorganic salts, and the like. While the aforementioned proportions are based on the active sulfonate component, it is to be understood that where commercial sulfonates are employed in formulating the additive concentrates of this invention, the concentrate composition can include the impurities contained in the sulfonate mixture. Also, other ingredients such as corrosion and oxidation inhibitors, bactericides, and other additive materials that have a beneficial effect on the soluble oils and microemulsions produced from the additive concentrate, such as water-soluble inorganic salts and other surface active materials and stabilizing agents, can be incorporated into the additive concentrate as desired.

Both anhydrous and water-containing soluble oils are prepared from the additive concentrates of this invention by admixing the additive concentrate with a liquid hydrocarbon and, if a microemulsion is desired, with water. Liquid hydrocarbons that can be admixed with the additive concentrate to form soluble oils include both pure hydrocarbon compounds and mixtures of hydrocarbon compounds. Exemplary liquid hydrocarbons include petroleum crude oil, such as crude oil previously recovered from a reservoir, or other conveniently available crude oil; refined or semi-refined petroleum products, such as gasoline, naphtha, stove oil, diesel and gas oil; residual products obtained by the distillation of lower boiling fractions from a crude oil, such as bunker fuel oil and other residual products; low value refinery by-products, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many oil recovery and well treating applications it is preferred to use a soluble oil compounded with petroleum crude oil, such as crude oil previously recovered from the reservoir, or with other conveniently available crude oil.

The soluble oils formed from the additive concentrate of this invention are oleaginous compositions which have the ability to spontaneously emulsify with water when admixed therewith. The emulsion formed by the addition of water to the soluble oil are of the water-in-oil type in that, at water concentrations less than the inversion concentration, oil is the continuous phase and the water is dispersed in the oil in the form of very fine droplets, or micelles, which are less than about 0.1 micron in size, and usually range in the size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely effecting the utility of the microemulsion. Emulsions of this type are designated microemulsions to distinguish them from ordinary water-in oil macroemulsions in which the lower limit of the size of the water droplets is about 0.1 micron. At water concentrations above the inversion concentration, the emulsion inverts to an oil-in-water emulsion in which droplets of oil are dispersed in a continuous water phase. In many applications, it is preferred that the water concentrations of the microemulsion be maintained below the inversion concentration so as to prevent inversion to emulsions of the oil-in-water type, while in other applications oil-inwater emulsions may be satisfactory, and are sometimes preferred. Microemulsions prepared from the aforedescribed additive concentrates containing both preferentially oil-soluble and preferentially water-soluble alkyl aryl sulfonates are particularly advantageous in that these microemulsions exhibit a minimum increase in viscosity because of water addition.

The soluble oils and microemulsions prepared from the additive concentrates of this invention have utility in a wide variety of applications including the recovery of oil from subterranean reservoirs by the techniques described in Pats. Nos. 3,500,918; 3,500,919; 3,500,922; 3,512,586; and 3,537,537. These soluble oils and microemulsions are also useful in treating water injection wells to ameliorate oil blockage from the formation surrounding the injection wells and in stimulating producing oil wells to increase oil production.

Further, the additive concentrates of this invention have relatively long storage lives and can conveniently be used to formulate any desired quantity of soluble oil or microemulsion.

The invention is further described by the following examples which are illustrative of specific modes of practicing the invention and are not intended as limiting the scope of the invention as defined by the appended claims.

EXAMPLE 1

A soluble oil additive concentrate is prepared by admixing 81.2 volume percent of a commercial surface active alkyl aryl sulfonate marketed by the Sonneborn Division of Witco Chemical Company, Inc. under the trademark Petronate CR, and 18.8 volume percent secondary butyl alcohol. Petronate CR is an oil solution containing about 62 percent of mixed alkyl aryl sodium monosulfonates having an average molecular weight in the range of about 490 to 510. The surface active alkyl aryl sulfonate and the secondary butyl alcohol are in the proportion of 2.68 parts of alkyl aryl sulfonate per part of secondary butyl alcohol.

A soluble oil is prepared by admixing 100 parts of the additive concentrate prepared in the above step with 212 parts by volume of 39° API Illinois crude oil. The resulting composition is a soluble oil of the following composition:

| | Vol. percent |
|---|---|
| Crude oil | 68.0 |
| Mixed alkyl aryl sulfonate [1] | 26.0 |
| Ethylene glycol monobutyl ether | 6.0 |

[1] Contains 62% active sulfonates.

Water containing about 700 p.p.m. dissolved salts is incrementally added to the soluble oil and the appearance and viscosity of the resulting microemulsion determined at each increment of water addition. These data are reported in Table 1.

TABLE 1

| Water content, volume percent added | Viscosity at 100° F., cp.[1] | Emulsion type | Appearance |
|---|---|---|---|
| 0 | 13.2 | W/o [2] | Clear. |
| 3.9 | 15.6 | W/o | Do. |
| 7.4 | 18.4 | W/o | Do. |
| 10.7 | 22.5 | W/o | Do. |
| 16.7 | 27.5 | W/o | Do. |
| 21.9 | 33.7 | W/o | Do. |
| 28.6 | 51.6 | W/o | Do. |
| 34.2 | 81.5 | W/o | Do. |
| 39.0 | [4] 328 | W/o | Do. |
| 44.0 | [5] 902 | W/o | Clear. |
| 50.0 | [6] 1,844 | | Slightly cloudy. |
| 54.6 | [6] 2,000 | | Cloudy. |
| 61.5 | 84.4 | O/w [3] | Do. |
| 66.7 | 42.3 | O/w | Do. |
| 72.0 | 10.0 | O/w | Do. |
| 75.0 | 6.8 | O/w | Do. |
| 80.0 | 6.0 | O/w | Do. |

[1] Measured with a Brookfield viscosimeter equipped with a UL adapter and operated at 6 r.p.m.
[2] Water-in-oil microemulsion.
[3] Oil-in-water microemulsion.
[4] Measured at 1.5 r.p.m.
[5] Measured at 0.6 r.p.m.
[6] Measured at 0.3 r.p.m.

EXAMPLE 2

A soluble additive concentrate is prepared by admixing 51.2 volume percent Petronate CR, 39.6 volume percent of a preferentially water-soluble surface active alkyl aryl sulfonate marketed by the Sonneborn Division of Witco Chemical Company, Inc. under the trademark Pyronate 30, and 9.2 volume percent secondary butyl alcohol. Pyronate 30 is an aqueous solution containing about 30 percent preferentially water-soluble petroleum sulfonates having an average molecular weight in the range of 330 to 350. The surface active alkyl aryl sulfonate and the secondary butyl alcohol are in the proportion of about 4.6 parts by volume of alkyl aryl sulfonate per part of secondary butyl alcohol. The preferentially oil-soluble and preferentially water-soluble alkyl aryl sulfonates are present in the proportion of about 2.9 parts of preferentially oil-soluble sulfonate per part of water-soluble sulfonate.

A soluble oil is prepared by admixing 100 parts of the additive concentrate prepared in the above step with 373 parts by volume of 39° API Texas crude oil. The resulting composition is a soluble oil of the following composition:

| | Vol. percent |
|---|---|
| Crude oil | 78.9 |
| Preferentially oil-soluble alkyl aryl sulfonates [1] | 11.2 |
| Preferentially water-soluble alkyl aryl sulfonates [2] | 7.9 |
| Secondary butyl alcohol | 2.0 |

[1] Contains 62% active sulfonates.
[2] Contains 30% active sulfonates.

Water containing about 700 p.p.m. dissolved salts is incrementally added to the soluble oil and the appearance and viscosity of the resulting microemulsions determined at each increment of water addition. These data are reported in Table 2.

TABLE 2

| Water content, volume Percent | Viscosity at 75° F., cp.[1] | Emulsion type | Appearance |
|---|---|---|---|
| 0 | 20.7 | W/o [2] | Clear. |
| 7.4 | 41.4 | W/o | Do. |
| 13.8 | 53.7 | W/o | Do. |
| 19.4 | 64.6 | W/o | Do. |
| 26.5 | 65.4 | W/o | Do. |
| 32.4 | 62.2 | W/o | Do. |
| 37.5 | 62.2 | W/o | Do. |
| 44.5 | 31.5 | W/o | Do. |
| 50.0 | 27.6 | W/o | Do. |
| 54.5 | 57.0 | W/o | Do. |
| 60.3 | 44.2 | | Do. |
| 65.7 | 15.4 | O/w [3] | Do. |
| 70.3 | 9.2 | O/w | Do. |
| 75.0 | 6.4 | O/w | Do. |

[1] Measured with a Brookfield viscosimeter equipped with a UL adapter and operated at 6 r.p.m.
[2] Water-in-oil microemulsion.
[3] Oil-in-water microemulsion.

EXAMPLE 3

An additive concentrate is prepared by admixing 43.7 volume percent of preferentially oil-soluble surface active alkyl aryl sulfonate marketed under the trademark Petronate CR, 32.5 volume percent of a preferentially water-soluble surface active alkyl aryl sulfonates marketed under the trademark Pyronate 30, and 23.8 volume percent secondary butyl alcohol. The surface active alkyl aryl sulfonate and the secondary butyl alcohol are in the proportion of 1.6 parts of alkyl aryl sulfonate per part of secondary butyl alcohol. The preferentially oil-soluble and preferentially water-soluble alkyl aryl sulfonates are present in the proportion of about 2.8 parts of preferentially oil-soluble sulfonate per part of water-soluble sulfonate.

A soluble oil is prepared by admixing 100 parts of the additive concentrate prepared in the above step with 258 parts by volume of 39° API Illinois crude oil and about 15 parts of water. The resulting composition is a substantially anhydrous soluble oil having the following composition:

| | Vol. percent |
|---|---|
| Crude oil | 69.2 |
| Preferentially oil-soluble sulfonate [1] | 11.7 |
| Preferentially water-soluble sulfonate [2] | 8.7 |
| Secondary butyl alcohol | 6.4 |
| Water | 4.0 |
| | 100.0 |

[1] Contains 62% active sulfonates.
[2] Contains 30% active sulfonates.

EXAMPLE 4

An additive concentrate for the formulation of soluble oils having the following composition:

| | Vol. percent |
|---|---|
| Preferentially oil-soluble alkyl aryl sulfonate [1] | 55.8 |
| Preferentially water-soluble alkyl aryl sulfonate [2] | 35.1 |
| Secondary butyl alcohol | 9.1 |
| | 100.0 |

[1] An oil solution containing about 62 percent of mixed aryl sodium sulfonates having an average molecular weight in the range of about 490 to 510 marketed by the Sonneborn Division of Witco Chemical Company, Inc. under the trademark Petronate CR.
[2] Pyronate 30.

Ratio of oil-soluble/water-soluble sulfonates _____ 3.3
Parts of alkyl aryl sulfonates per part of stabilizing agent _____ 5.0

EXAMPLE 5

An additive concentrate for the formulation of soluble oils having the following composition:

| | Vol. percent |
|---|---|
| Preferentially oil-soluble alkyl aryl sulfonate [1] | 44.9 |
| Preferentially oil-soluble alkyl aryl sulfonate [2] | 17.9 |
| Preferentially water-soluble alkyl aryl sulfonate [3] | 21.8 |
| Secondary butyl alcohol | 15.4 |
| | 100.0 |

[1] An oil solution containing about 69 percent of mixed alkyl aryl ammonium sulfonates having an average molecular weight of about 460.
[2] An oil solution containing about 62 percent of mixed alkyl aryl sodium sulfonates having an average molecular weight in the range of about 440 to 470 marketed by the Sonneborn Division of Witco Chemical Company, Inc. under the trademark Petronate HL.
[3] A water solution containing about 50 percent of mixed alkyl aryl sulfonates having an average molecular weight of about 330 to 350 marketed by the Sonneborn Division of Witco Chemical Company, Inc. under the trademark Pyronate 50.

Ratio of oil-soluble/water-soluble sulfonates ____ 3.9
Parts of alkyl aryl sulfonate per part of stabilizing agent _____ 3.4

EXAMPLE 6

An additive concentrate having the composition:

| | Vol. percent |
|---|---|
| Preferentially oil-soluble alkyl aryl sulfonate [1] | 85.6 |
| Preferentially water-soluble alkyl aryl sulfonate [2] | 9.3 |
| Secondary butyl alcohol | 5.1 |
| | 100.0 |

[1] 65 percent alkyl aryl sulfonate.
[2] 50 percent alkyl aryl sulfonate.

Ratio of oil-soluble sulfonate/water-soluble sulfonate _____ 11.8
Parts of sulfonate per part of stabilizing agent ____ 11.8

EXAMPLE 7

An additive concentrate having the composition:

| | Vol. percent |
|---|---|
| Preferentially oil-soluble alkyl sulfonate [1] | 91.9 |
| Secondary butyl alcohol | 8.1 |
| | 100.0 |

[1] An oil solution containing about 69 percent of mixed alkyl having an average molecular weight in the range of about 440 to 470 marketed by the Sonneborn Division of Witco Chemical Company, Inc. under the trademark Petronate HL.

EXAMPLE 8

An additive concentrate having the composition:

| | Vol. percent |
|---|---|
| Preferentially oil-soluble alkyl aryl sulfonate [1] | 78.4 |
| Secondary butyl alcohol | 21.6 |
| | 100.0 |

[1] An oil solution containing about 69 percent of mixed alkyl aryl ammonium sulfonates having an average molecular weight of about 460.

Parts of sulfonate per part of stabilizing agent ____ 2.5

Various embodiments and modifications of this invention have been described in the foregoing description and examples, and further modifications will be apparent to those skilled in the art. Such modifications are included within the scope of this invention as defined by the following claims.

Having now described the invention, I claim:

1. A soluble oil additive concentrate consisting essentially of an admixture of (1) preferentially oil-soluble surface active alkyl aryl sulfonate and preferentially water-soluble surface active alkyl aryl sulfonate in the proportion of about 1 to 12 parts by volume of oil-soluble alkyl aryl sulfonate per part of water-soluble alkyl aryl sulfonate, and (2) secondary butyl alcohol in the proportion of about 1 to 12 parts by volume of said sulfonates per part of said secondary butyl alcohol, said additive concentrate upon admixture with about 45 to 90 volume percent of petroleum crude oil forming a crude oil base soluble oil having the property upon contacting water of forming stable water-in-oil microemulsions at all water contents up to the inversion water concentration.

2. The composition defined in claim 1 wherein the ingredients are in the proportion of about 2 to 7 parts by volume of said sulfonates per part of said secondary butyl alcohol.

3. The composition defined in claim 1 wherein said sulfonates are present in the proportion of about 1 to 4 parts by volume of said preferentially oil-soluble alkyl aryl sulfonate per part of said preferentially water-soluble alkyl aryl sulfonate.

4. The composition defined in claim 1 wherein said preferentially oil-soluble alkyl aryl sulfonate is an alkyl aryl monosulfonate having an average molecular weight in excess of about 400 and wherein said preferentially water-soluble alkyl aryl sulfonates are alkyl aryl monosulfonates exhibiting an average molecular weight of less than about 400 or are polysulfonates.

5. The composition defined in claim 4 wherein said preferentially oil-soluble sulfonates have an average molecular weight in excess of about 450.

6. The composition defined in claim 4 wherein said preferentially oil-soluble alkyl aryl sulfonates exhibit an average molecular weight in the range of about 480 to 550.

7. An additive concentrate for the formulation of soluble oils consisting essentially of an admixture of (1) preferentially oil-soluble surface active alkyl aryl monosulfonate having an average molecular weight in the range of about 450 to 550 and preferentially water-soluble surface active alkyl aryl monosulfonate having an average molecular weight of less than about 400 and/or preferentially water-soluble alkyl aryl and polysulfonates in the proportion of about 1 to 4 parts by volume of preferentially oil-soluble sulfonate per part of preferentially water-soluble sulfonate, and (2) secondary butyl alcohol in the proportion of about 2 to 7 parts by volume of said sulfonates per part of secondary butyl alcohol.

8. The composition defined in claim 7 wherein said preferentially oil-soluble surface active alkyl aryl monosulfonate exhibits an average molecular weight in the range of about 480 to 550.

References Cited

UNITED STATES PATENTS

| | | | |
|---|---|---|---|
| 2,552,913 | 5/1951 | Waugh | 252—49.5 X |
| 3,308,068 | 3/1967 | Jones | 252—8.55 X |
| 3,477,511 | 11/1969 | Jones et al. | 166—274 |
| 3,348,611 | 10/1967 | Reisberg | 166—274 |
| 3,468,377 | 9/1969 | Dunlap et al. | 252—8.55 X |
| 3,163,214 | 12/1964 | Csaszar | 252—8.55 X |

HERBERT B. GUYNN, Primary Examiner

U.S. Cl. X.R.

252—309